United States Patent [19]
Franz

[11] Patent Number: 5,144,919
[45] Date of Patent: Sep. 8, 1992

[54] TWO-STROKE CYCLE RECIPROCATING INTERNAL COMBUSTION ENGINE FOR SPARK IGNITION AND CRANKCASE SCAVENGING

[76] Inventor: Laimböck Franz, Waldsdorfberg 86, A-8051 Graz-Thal, Austria

[21] Appl. No.: 750,529

[22] Filed: Aug. 27, 1991

[30] Foreign Application Priority Data

Sep. 7, 1990 [AT] Austria .................. 1828/90

[51] Int. Cl.[5] .............................................. F02B 75/02
[52] U.S. Cl. .................. 123/65 W; 123/73 PP
[58] Field of Search ............. 123/65 R, 65 A, 65 W, 123/73 B, 73 PP, 73 C

[56] References Cited

U.S. PATENT DOCUMENTS

| | | | |
|---|---|---|---|
| 4,768,474 | 9/1988 | Fujimoto et al. ................ | 123/73 B |
| 5,027,759 | 7/1991 | Luo ................................. | 123/73 PP |
| 5,033,418 | 7/1991 | Maissant et al. ................ | 123/73 PP |
| 5,060,602 | 10/1991 | Maissant ......................... | 123/73 PP |

FOREIGN PATENT DOCUMENTS

| | | | |
|---|---|---|---|
| 391351 | 11/1985 | Austria . | |
| 0005476 | 1/1980 | Japan ............................... | 123/73 PP |
| WO91/02144 | 2/1991 | PCT Int'l Appl. ............... | 123/73 B |

Primary Examiner—David A. Okonsky
Attorney, Agent, or Firm—Collard & Roe

[57] ABSTRACT

A two-stroke cycle reciprocating internal combustion engine for spark ignition and crankcase scavenging comprises a fuel injection nozzle and an arbitrarily operable throttle valve, which is provided in an air intake passage in upstream of leaf spring dampers, which are biased in a cloging sense. To provide such as engine which exhibits a fast response and produces an exhaust gas having a favorable composition also during an operation under a light load and in which even a fast opening of the throttle valve will not result in a formation of an undesirable fuel-air mixture, the leaf spring dampers are close to the throttle valve, which preferably consist of a rotary valve, a branch line is provided, which is designed to direct a flow of air under desirable aerodynamic conditions to the region adjacent to the outlet of the fuel injection nozzle, the throttle valve, which preferably consists of a rotary valve, is designed to open only said branch passage when the throttle valve is in a position between its idling position and a predetermined light load position, at least one leaf spring damper is associated with said branch line and the flow area of said branch line is only a fractional part of the flow area of the entire air intake system.

9 Claims, 3 Drawing Sheets

TWO-STROKE CYCLE RECIPROCATING INTERNAL COMBUSTION ENGINE FOR SPARK IGNITION AND CRANKCASE SCAVENGING

BACKGROUND OF THE INVENTION

1. Field of the Invention

This invention relates to a two-stroke cycle reciprocating internal combustion engine for spark ignition and crankcase scavenging, comprising a fuel injection nozzle and an arbitrarily operable throttle valve, which is provided in an air intake passage upstream of leaf spring dampers, which are biased in a cloging sense.

2. Description of the Prior Art

In known two-stroke cycle internal combustion engines of that kind there is a relatively large distance or read space between the throttle valve and the leaf spring dampers, which open and close in dependence on the pressure difference between the air intake passage and the crankcase, and there is also a large distance between the throttle valve and the fuel injection nozzle. Besides, the flow areas of the intake passage downstream and upstream of the throttle valve are substantially equal. For this reason the reduced velocity of flow of the fresh air during an operation of the engine under light load will result adjacent to the fuel injection nozzle in the formation of a poorer mixture, which contains relatively large droplets. A poor mixture will obviously adversely affect the composition of the exhaust gas.

If the fuel injection is electronically controlled by a sensor which detects the instantaneous position of the throttle valve a fast opening of the throttle valve will cause the quantity of injected fuel to be increased as a result of the next computing operation. But it will then be necessary to accelerate the relatively large quantity of which is contained in the entire intake system and this requirement will delay the response of the internal combustion engine and will also result in a poorer composition of the exhaust gas because the fuel-air mixture has an unfavorable composition.

In austrian Patent Specification No. 391,351 it has already been proposed to arrange the fuel injection nozzle in an oblique position i the cylinder wall and so to arrange said nozzle that is discharges a fuel jet through a window formed in the piston skirt and substantially toward the position head. In that engine the interior of the hollow piston is substantially closed from the crankcase. The transfer port and the fuel injection nozzle are provided on that side which is opposite of the exhaust port. That arrangement will result in the formulation of an improved mixture because at lest a part of the fuel jet will impinge on the piston head, which is that part of the piston that is at the highest temperature during the operation of the engine. Besides, the piston head is cooled because the energy corresponding to the latent heat of eva-oration is extracted from the piston head. Finally, a stratified charge is formed in the combustion chamber because the rich mixture enters the combustion chamber on that side which is opposite to the exhaust pot and only a very poor mixture flows from the crankcase case into the cylinder chamber through those transfer ports which are nearer to the exhaust port. As a result, only a poor mixture can flowing the worst case into the exhaust port. This will result in an improved fuel consumption and in an improved composition of the exhaust gas. But in that teaching the requirements of an operation under light load and for a fast response of the engine and the conditions resulting from a fast opening of the throttle valve have not been taken into account.

SUMMARY OF THE INVENTION

It is an object of the invention to provide a two-stroke cycle internal combustion engine which is of the type descried firs therein before and which exhibits a fast response and produces an exhaust gas having a favorable composition also during an operation under a light load an in which even a fast opening of the throttle valve will not result in a formation of an undesirable fuel-air mixture.

The object set forth is accomplished in accordance with invention essentially in that the leaf spring dampers are close to the throttle valve, which preferably consist of a rotary valve, a branch line is provided, which is designed to direct a flow of air under desirable aerodynamic conditions to the region adjacent to the outlet of the fuel injection nozzle, the throttle valve, which preferably consists of a rotary valve, is designed to pen only said branch passage when the throttle valve is in a position between its idling position and a predetermined light load position, at least one leaf spring damper is associated with said branch line and the flow area of said branch line is only a fractional part of the flow area of the entire air intake system.

Because fresh air is supplied to the region adjacent to the outlet of the fuel injection nozzle only through the branch line when the engine is idling or operating under a light load below a predetermined load and the leaf spring damper for closing the branch line may have a stiffness which differs from the stiffness of the remaining leaf spring dampers, the mixtures will flow in that branch conduit at a high velocity and this will give rise to strong turbulences and transverse currents in the region of the outlet of the nozzle. As a result, the fuel jet will effectively be atomized into minute droplets so that an improved mixture will be formed. Because the leaf spring dampers are close to the throttle valve, the dad space is minimized so that the engine has a fast earphones as much smaller air volumes re required to be accelerated.

The atomization of the fuel and, as a result, the formation of the mixture during an operation under light loads will further be improved if the branch line adjacent to the outlet of the fuel injection nozzle is defined by a swirl-producing flow-guiding surface which surrounds said outlet.

According to a further feature of the invention the axis of the fuel injection nozzle extends obliquely through the cylinder wall and through at least one window in the skirt of the hollow piston and is preferably directed toward the piston head, the exit passage defined by the swirl-producing flow-guiding surface has the same orientation as the fuel injection nozzle, and the transfer part or parts leading from the interior of the piston, which interior is substantially closed toward the crankcase, into the interior of the cylinder are provided on that side of the piston which is opposite to the exhaust port. That arrangement will ensure the desired stratification of the charge in the cylinder chamber during an operation of the engine under a light load and under full load and a flow of a rich mixture form a transfer port or ports directly to the exhaust port will be avoided.

To improve the composition of the exhaust gas during a cold start, heatable surfaces may be included in the swirl-producing flow-guiding surface; such surfaces may e constituted by guide walls, which serve to produce a swirl.

In a particularly desirable design the throttle vale optionally consisting of a rotary valve, the leaf spring dampers and optionally also the fuel injection nozzle are included in a a subassembly, which is flanged to the cylinder.

It will be desirable to provide between the throttle vale optionally consisting of a rotary valve and the fuel injection nozzle and substantially streamlined body, to which the leaf spring dampers are secured and which also constitutes a stop for limiting the opening movement of the leaf spring dampers and constitutes an inside surface of the branch line and of the passages for supplying fresh air to the crank-case so that the fuel injection nozzle is by-passed by a streamlined flow path. The provision of that flow-guiding body desirably reduces the dead space to a minimum and ensures that the fresh air passages and the branch line have a desirable shape. This is achieved in spite of the fact that the fresh air must flow past the fuel injection nozzle, which usually can be accommodated only with difficulty and which can now be by-passed owing to the provision of the inexpensive flow-guiding member.

DETAILED DESCRIPTION OF THE DRAWING

Figure 1:
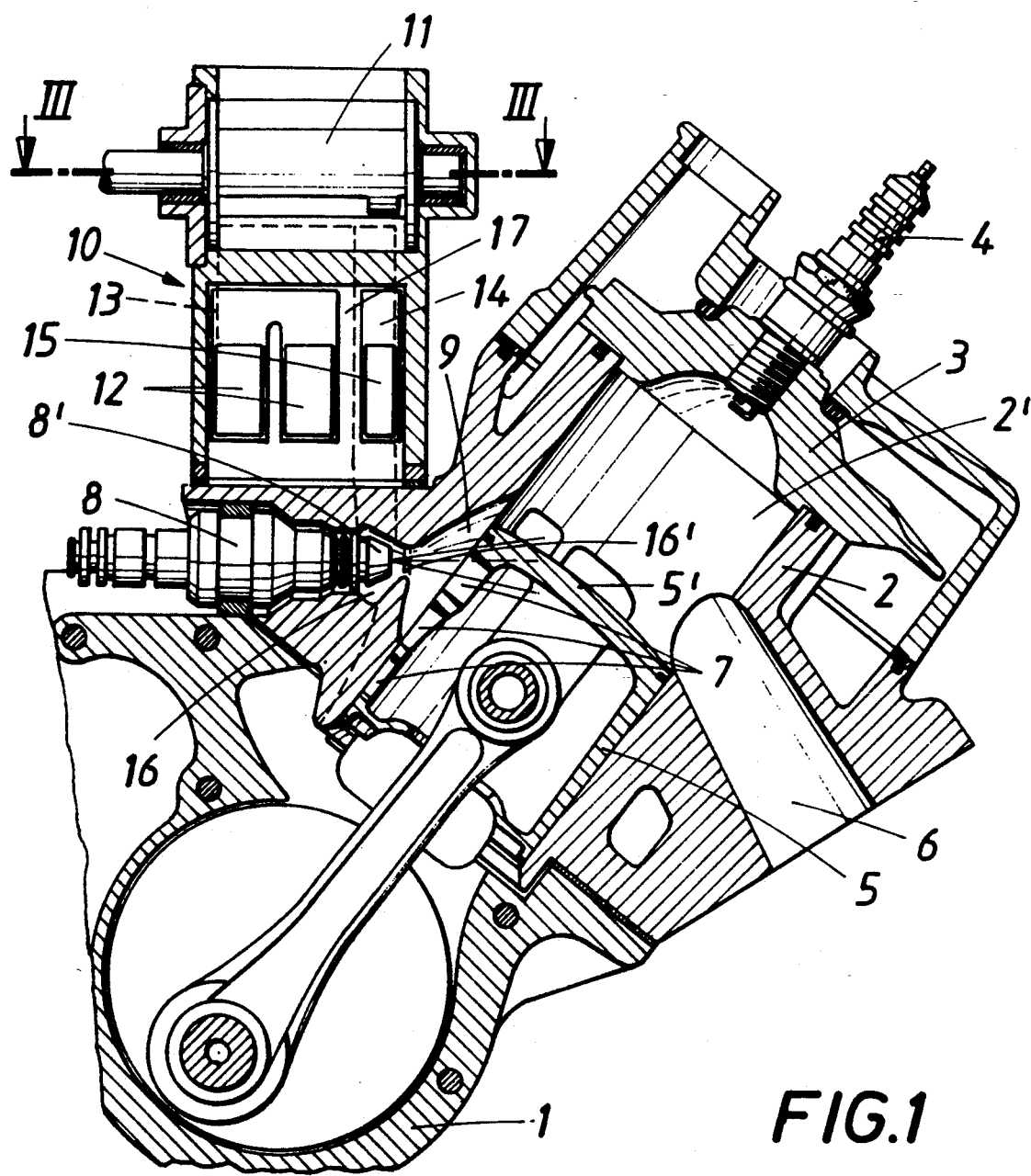
FIG. 1 is a sectional view showing a two-stroke cycle reciprocating internal combustion engine for spark ignition as viewed on the plane extending through the cylinder axis transversely to the crankshaft.
Figure 2:
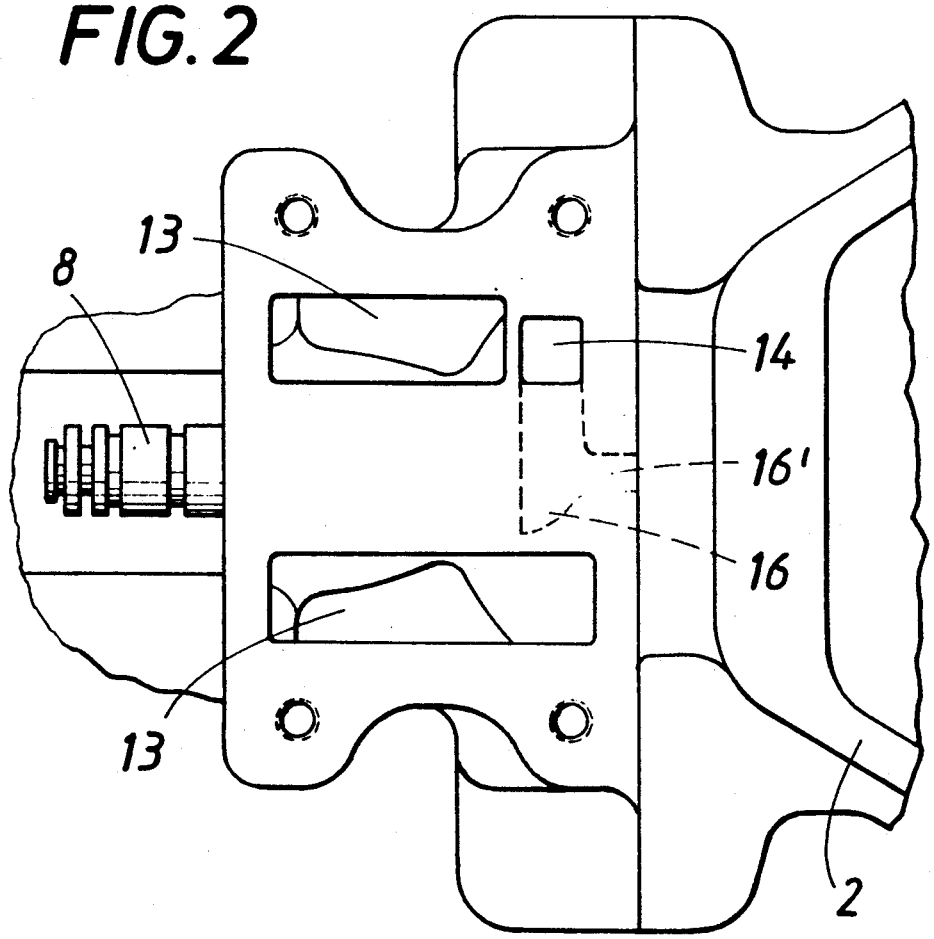
FIG. 2 is a top plan view on the surfaces provided for a sealed attachment of the subassembly that comprises the throttle valve and the leaf spring dampers.
Figure 3:
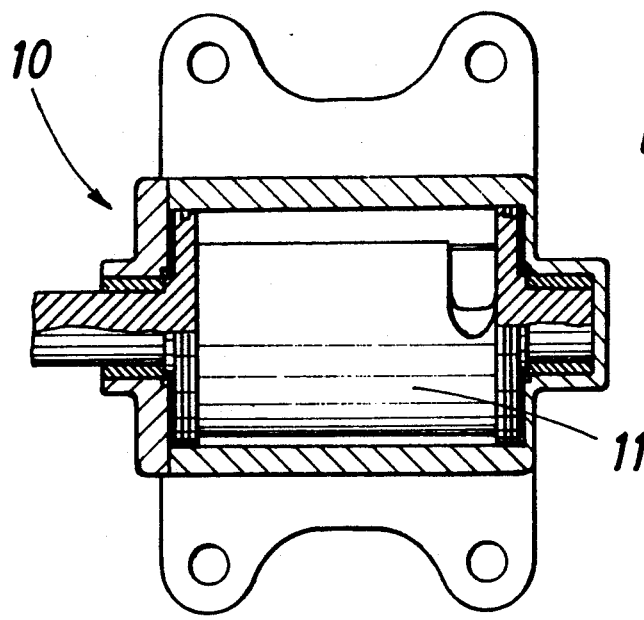
FIG. 3 is a sectional view showing that subassembly viewed on line III—III in FIG. 1.

An embodiment of the invention will now be described by way of example with reference to the drawing.

A cylinder 2 is secured to the crankcase 1 and comprises a cylinder head 3, in which a spark plug 4 is mounted. The piston 5 is shallow and its interior is substantially closed toward the crankcase 1 and its skirt is formed with a plurality of windows 7 on that side which is opposite to the exhaust port 6 of the cylinder 2. A fuel injection nozzle 8 has an axis which extends obliquely through the cylinder wall and is arranged to discharge a jet which is directed through said windows 7 and substantially toward the piston head 5'. A transfer passage 9 leads from that side of the piston which is provided with the windows 7 or from the windows 7 into the cylinder chamber 2'. Additional transfer ports are closer to the exhaust port and connect the crankcase 1 to the cylinder chamber 2' so that an effective scavenging of the crankcase is ensured.

Figure 4:
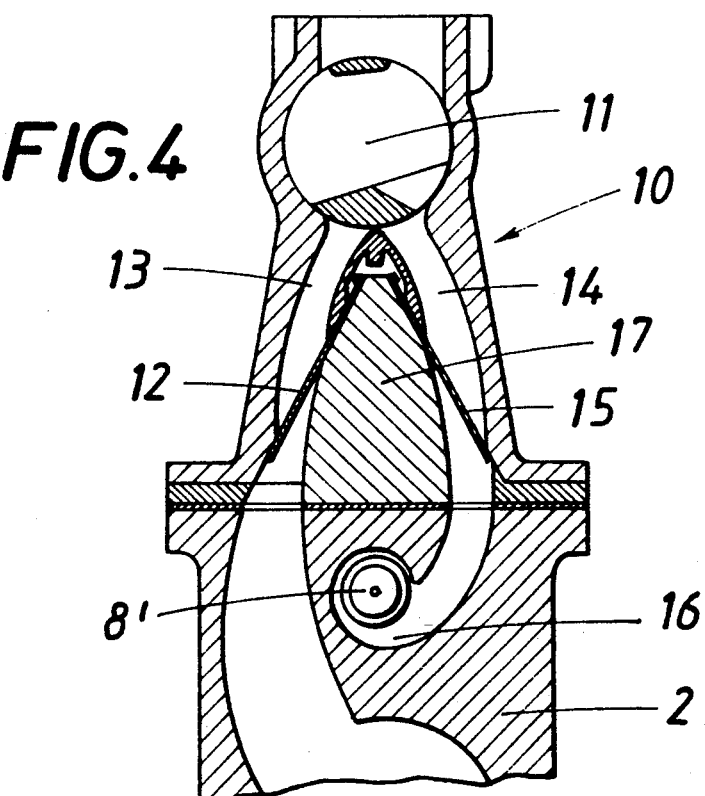
FIGS. 4 to 6 are sectional views showing the subsassembly viewed transversely to the axis of the rotary valve when the latter is in position for an idling of the engine and for an operation of the engine under a light load and under full load, respectively.
Figure 5:
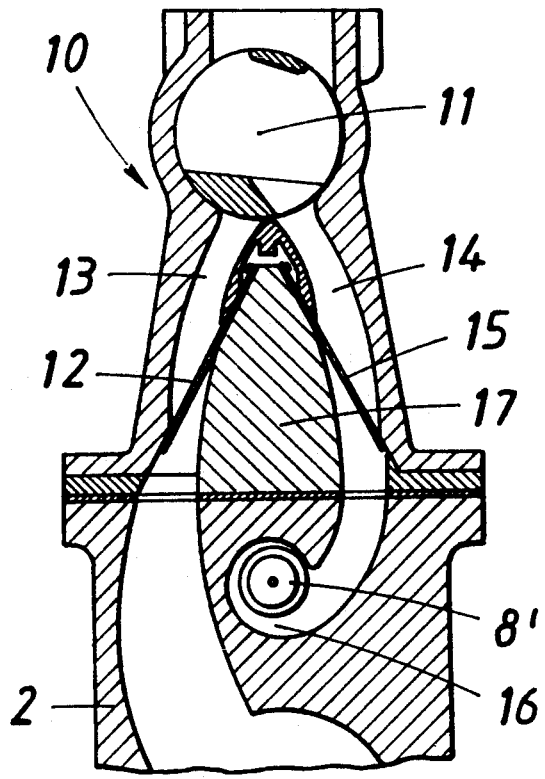
Figure 6:
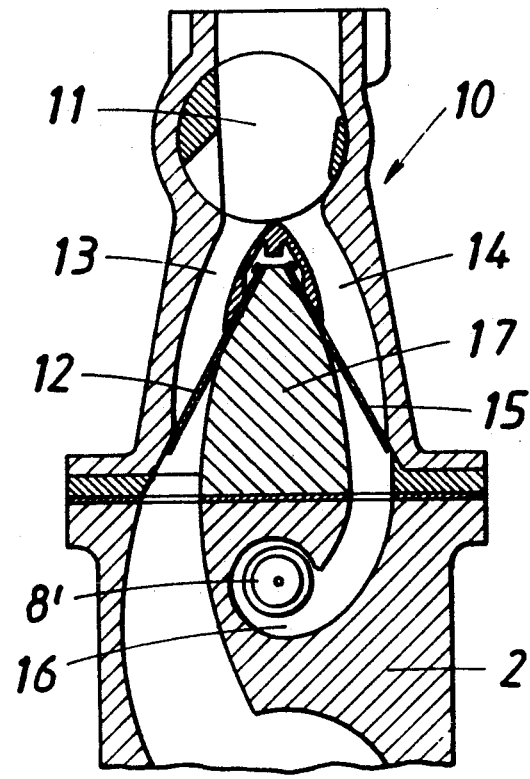

A subassembly which is generally designated 10 is flanged to the cylinder or cylinder block 2 and includes a throttle valve consisting of a rotary valve 11 for controlling the flow of fresh air into the cylinder chamber 2' and leaf spring dampers 12 for controlling the flow in fresh air passages 13 leading into the crankcase 1. It is apparent that the leaf spring dampers 12 are close to the rotary valve 11 on the downstream side thereof. The rotary valve 11, which constitutes the throttle valve, is so designed that during a movement of the rotary valve 11 between a position shown in FIG. 4 for an idling of the engine and a position shown in FIG. 5 for an operation of the engine under a predetermined light load the rotary valve 11 will open only a branch line 14 defining an aerodynamically desirable flow path leading to the region adjacent to the outlet 8' of the fuel injection nozzle 8. a separate leaf spring damper 15 is associated with the branch line 14, which has a flow area that is less than one-half of the total flow area of the air intake system. Only when the rotary valve 11 is in the position shown in FIG. 6 for an operation of the engine under full load are the fresh air passages 13 also opened to a larger or smaller extend depending on the position of the leaf spring dampers 12 associated with the passages 13.

Adjacent to the outlet 8' to the fuel injection nozzle 8 the branch line 14 is defined by a swirl-producing flow-guiding surface 16, which surrounds the fuel injection nozzle 8 adjacent to its outlet 8'. As a result, when the rotary valve 11 is in its position for a light load the mixture will flow in the branch line 14, which may optionally consist of two passes, at a high velocity and will rise to strong turbulences and transverse currents around the outlet 8' of the fuel injection nozzle 8 so that the fuel will be atomized to form minute droplets and the air and fuel will thoroughly e mixed. The exit passage 16' defined by the swirl-producing flow-guiding surface 16 has the same orientation as the axis to the fuel injection nozzle 8 and the fuel jet discharged by said nozzle. Because only the transfer port 9 provided on that side which is opposite to the exhaust port 6 is available for the flow of a rich mixture into the cylinder chamber 2', the charge will be stratified as desired and a short circuit from the transfer passage 9 to the exhaust port 6 will substantially be prevented.

The leaf spring dampers 12, 15 are secured to a flow-guiding body 167, which is disposed between the throttle valve consisting of the rotary valve 11 and the fuel injection nozzle 8 and which serves as a stop for limiting the opening movement of the leaf spring dampers 12 and 15. That flow-guiding body 17 constitutes an inside surface defining the branch line 14 and an inside surface defining the fresh air passages 13 so that the fuel injection nozzle 8 is by-passed by a stream-lined flow path, as is apparent from FIGS. 4 to 6.

I claim:
1. In an internal combustion engine comprising
    a cylinder having an exhaust port on one side,
    a piston movable in said cylinder and defines a cylinder chamber therein,
    a crankcase communicating with the interior of said cylinder,
    spark plug means exposed to said cylinder chamber,
    means defining a charging passage leading to the interior of said cylinder,
    a fuel injection nozzle having an outlet disposed in aid charging passage,
    a throttle valve,
    air intake passage means leading from said throttle valve to said crankcase, and
    leaf spring damper means close to said throttle valve controlling the flow area of said air intake passage means and based in a closing sense,
    the improvement residing in that a branch line having a smaller flow area than said air intake passage means leads from said throttle valve and opens into said charging passage adjacent to said outlet of said nozzle, additional leaf spring damper means close to said throttle valve biased in a closing sense controlling the flow area of said branch line, said throttle valve is movable to an idle position for an idling of said engine, to a pane of light load positions for an operation of said engine up to a predetermined light load, and to a full load position, and is arranged to open only said branch line in said idle position and any position of said range and to open said branch line and said air intake passage means in any position between said range and said full load position, inclusive.

2. The improvement set forth in claim 1 wherein said throttle valve consists of a rotary valve.

3. The improvement set forth in claim 1, wherein said branch line is defined adjacent to said outlet of said nozzle by a swirl-producing flow-guiding surface, which surrounds said outlet.

4. The improvement set forth in claim 3 as applied to an engine in which said position is hollow and has a piston head and a piston skirt formed with a window which is adapted to register with said charging passage and said fuel injection nozzle is arranged to discharge a fuel stream through said window into the interior of said piston, wherein said flow-guiding surface defines an exist passage leading into said charging passage and having the same orientation as said nozzle, the interior of said piston is substantially closed toward said crankcase, and said piston is formed on that side which is opposite to said exhaust port with transfer port means leading from the interior of said piston into the interior of said cylinder.

5. The improvement set forth in claim 4, as applied to an internal combustion engine in which said nozzle is arranged to discharge said fuel dream toward said piston head.

6. The improvement set forth in claim 4, wherein said swirl-producing flow-guiding surface comprises heatable surface portions.

7. The improvement set forth in claim 1, wherein said throttle valve and said leaf spring damper means are included in a subassembly, which is flanged to said cylinder.

8. The improvement set forth in claim 7, wherein said fuel injection nozzle is also included in said subassembly.

9. The improvement set forth in claim 7, wherein a flow-guiding body disposed between said throttle valve and said fuel injection nozzle and constitutes an inside surface of said branch line and an inside surface of said air intake passage means to define streamlined flow paths by-passing said nozzle and each of said leaf spring damper means are secured to said flow-guiding body and arranged to limit the opening movement of said leaf spring damper means.

* * * * *